Figure 1:
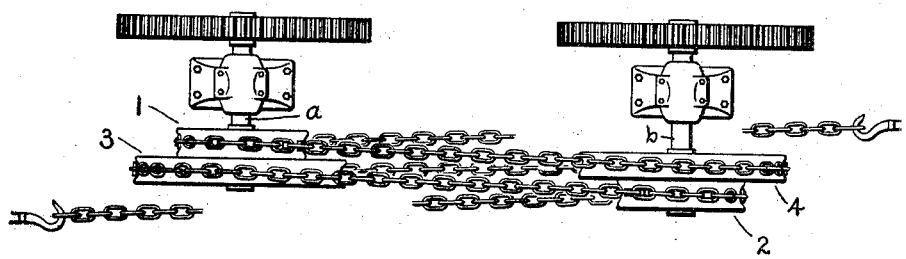

No. 706,962. Patented Aug. 12, 1902.
M. T. A. KUBIERSCHKY.
AUTOMATIC TENSION DEVICE FOR CHAINS OR OTHER TRACTION MEANS.
(Application filed Oct. 17, 1901.)
(No Model.)

Witnesses.
J. Ellis Glenn.
Benjamin R. Hull.

Inventor.
Martin T. A. Kubierschky.
by Albert G. Davis
Atty.

UNITED STATES PATENT OFFICE.

MARTIN T. A. KUBIERSCHKY, OF BERLIN, GERMANY.

AUTOMATIC TENSION DEVICE FOR CHAINS OR OTHER TRACTION MEANS.

SPECIFICATION forming part of Letters Patent No. 706,962, dated August 12, 1902.

Application filed October 17, 1901. Serial No. 78,932. (No model.)

*To all whom it may concern:*

Be it known that I, MARTIN T. A. KUBIERSCHKY, a subject of the Emperor of Germany, residing at Berlin, Germany, have invented certain new and useful Improvements in Automatic Tension Devices for Chains or other Traction Means, (Case No. 2,441,) of which the following is a specification.

If by means of rope or chain pulleys a rotary movement is to be converted into a straight rope movement, an endless chain or rope is preferably used, which is kept taut by a special tension-pulley or a similar device in order to prevent the slipping of the rope on the driven or driving wheel. In certain applications of this device—as, for instance, in the chain operation of the motor-plow of the German Patent No. 79,281, in which an endless rope cannot be employed or only with very poor results—there is difficulty in keeping the rope taut on the driving wheel or wheels. For this reason the rope is usually led back and forth over several parallel pulleys in order to increase the friction of the rope in the grooves; but then there still exists the danger that when the off-running end is entirely slack the rope will loosen and slide in the grooves. Care must therefore be taken in all such plants that the off-running end is kept taut—that is, that the turns of the rope always lie tightly in the grooves of the rope-pulleys. Keeping this end taut is not so easily possible in many cases—as, for example, in the above-cited instance—as with an endless rope. The construction hereinafter described provides a simple means to eliminate this defect, for if the rope or other flexible member after it has passed the actuating-drum is allowed to run over a wheel which rotates at a greater circumferential speed than the former then the rope will tend, in consequence of its friction on this wheel, to run faster than is called for by the driving means—that is, the end running off from the rope-drums to the larger wheel is always kept at a certain tension. As the rope can only run off with the circumferential speed of the driving-drum, it must naturally slip on the larger wheel, which we will call the "tension-wheel," by the amount of the difference of the circumferential speed. A slight loss in power will of course result from this slipping; but the same cannot be compared with the advantage of maintaining the tension. The method of allowing the off-running end of the traction means to run over a larger tension-wheel becomes still more valuable when using a chain instead of a rope. If in such plants grooved or whelp wheels are employed—that is, those in which the chain-links enter into corresponding notches of the driving circumference—it easily happens that the chain-links become tightly wedged in the notches and that then the running-off end does not fall off regularly, but is carried along, finally causing the rupture of the chain. If, on the contrary, the running-off end is allowed to run over the above-described tension-wheel, the chain is always drawn off with a certain tension from the grooved wheel, thus preventing its being caught. If such a power-transmitting system is to run not only in one direction, but in both, then the ingoing end will at times be the off-running, and vice versa. For this reason a tension-wheel must then be used at both the ingoing and outcoming end.

Figure 2:
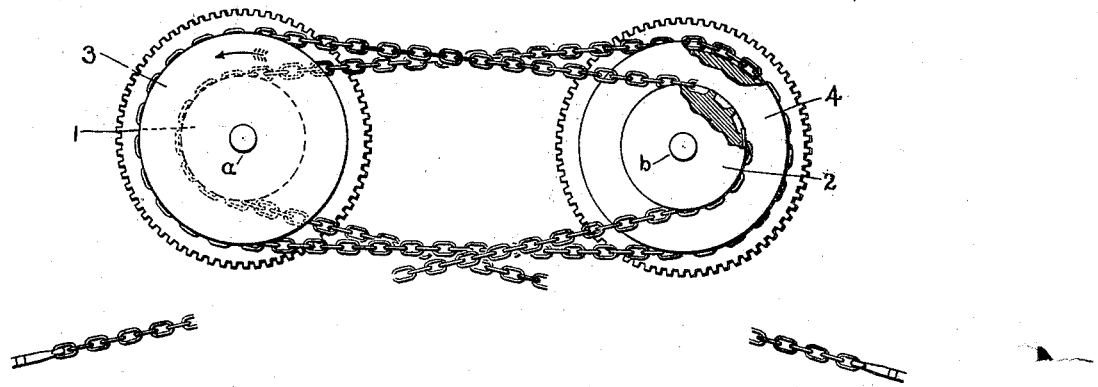

In the drawings, Figure 1 is a plan, and Fig. 2 is a side elevation, of my invention.

1 and 2 are chain-wheels, 3 and 4 wheels with a smooth grooved circumference and a larger diameter than 1 and 2. Wheels 1 and 3, as also 2 and 4, are each keyed to an axle *a* and *b*, respectively, supported in suitable bearings, and both axles are actuated, through gears or other power devices, by a motor at the same speed. If the rotation takes place in the direction of the arrow, the chain runs successively over the wheels 2, 3, 4, and 1. As both wheels 3 and 4 have a greater circumferential speed than 2 they act as tension-wheels, and the chain must slide on them and run off from 2 under tension. The symmetrical arrangement has the advantage that the entire operation can take place in reversed order, the chain running over 1 4 3 2, whereby 4 and 3 again act as tension-wheels.

The essence of the invention thus consists in having a chain (not endless) drawn over a chain-wheel, whereby the running-off end must be pulled off by a special device, this pull being given the chain by a wheel which has a greater circumferential speed than the chain-wheel.

What I claim as new, and desire to secure by Letters Patent of the United States, is—

1. In a power-transmitting system, the combination with a flexible member made fast at each end, of two driving-wheels, and two smooth tension-wheels, one on each driving-wheel shaft and of larger diameter than the driving-wheels, said flexible member passing around both driving-wheels and both tension-wheels.

2. In a power-transmitting system, the combination with two driving-wheels, of two smooth tension-wheels, one on each driving-shaft and of larger diameter than the driving-wheels, and a chain or rope, or the like, made fast at each end and passing first around one driving-wheel, then around both tension-wheels, and then around the other driving-wheel.

In witness whereof I have hereunto set my hand this 27th day of September, 1901.

MARTIN T. A. KUBIERSCHKY.

Witnesses:
HENRY HASPER,
WOLDEMAR HAUPT.